US012774029B2

(12) United States Patent
Abuaita et al.

(10) Patent No.: US 12,774,029 B2
(45) Date of Patent: Oct. 27, 2026

(54) DETECTING FRONT OR REAR VEHICLE MISALIGNMENT USING VEHICLE SENSORS

(71) Applicant: GM GLOBAL TECHNOLOGY OPERATIONS LLC, Detroit, MI (US)

(72) Inventors: Raed Nasim Abuaita, Fenton, MI (US); Jason W. Gaydos, Waterford, MI (US); Brian Porto, Wixom, MI (US); Mohammadali Shahriari, Markham (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 46 days.

(21) Appl. No.: 18/784,153

(22) Filed: Jul. 25, 2024

(65) Prior Publication Data

US 2026/0028061 A1 Jan. 29, 2026

(51) Int. Cl.

| | |
|---|---|
| ***B62D 7/15*** | (2006.01) |
| ***B62D 15/02*** | (2006.01) |
| ***G06T 7/20*** | (2017.01) |
| ***G06V 10/764*** | (2022.01) |
| ***G06V 20/56*** | (2022.01) |

(52) U.S. Cl.

CPC ........... *B62D 7/159* (2013.01); *B62D 15/021* (2013.01); *G06T 7/20* (2013.01); *G06V 10/764* (2022.01); *G06V 20/56* (2022.01); *G06T 2207/30252* (2013.01)

(58) Field of Classification Search

CPC ........ B62D 7/159; B62D 15/021; G06T 7/20; G06T 2207/30252; G06V 10/764; G06V 20/56

See application file for complete search history.

(56) References Cited

U.S. PATENT DOCUMENTS

| | | | | |
|---|---|---|---|---|
| 8,504,243 | B2 | 8/2013 | Kageyama | |
| 10,685,505 | B2 * | 6/2020 | Javid | B62D 15/021 |
| 11,623,686 | B1 * | 4/2023 | Thalman | G01S 19/42 701/41 |

(Continued)

OTHER PUBLICATIONS

German Office Action for German Application No. 102024127118.3; dated Jun. 2, 2025; 5 pages.

*Primary Examiner* — Grant Moubry

*Assistant Examiner* — Ruben Picon-Feliciano

(74) *Attorney, Agent, or Firm* — CANTOR COLBURN LLP

(57) ABSTRACT

Examples described herein provide a method for detecting front or rear vehicle misalignment using a vehicle sensor of a vehicle. The method includes determining whether the vehicle is in a misalignment detection state. The method further includes, responsive to determining that the vehicle is in the misalignment detection state, determining whether the vehicle is experiencing a misalignment. The method further includes, responsive to determining that the vehicle is experiencing the misalignment, classifying the misalignment as one of a front misalignment or a rear misalignment by comparing a vehicle heading angle to a vehicle motion angle, the vehicle motion angle being determined using sensor data received from the vehicle sensor. The method further includes performing an alignment mitigation action to mitigate negative effects of the misalignment on the vehicle.

20 Claims, 7 Drawing Sheets

(56) References Cited

U.S. PATENT DOCUMENTS

| | | | | |
|---|---|---|---|---|
| 2007/0213893 | A1* | 9/2007 | Stevenson | G01M 17/06 701/33.9 |
| 2011/0178671 | A1* | 7/2011 | Bae | G01B 21/26 701/31.4 |
| 2015/0158525 | A1 | 6/2015 | Pastor et al. | |
| 2017/0190355 | A1* | 7/2017 | Ghoneim | B62D 15/021 |
| 2019/0325290 | A1* | 10/2019 | Tong | G06N 3/09 |
| 2020/0172165 | A1* | 6/2020 | Chen | B62D 15/025 |
| 2021/0402984 | A1* | 12/2021 | Funke | B60W 10/20 |

* cited by examiner

DETECTING FRONT OR REAR VEHICLE MISALIGNMENT USING VEHICLE SENSORS

BACKGROUND

The subject disclosure relates to vehicles, and in particular to detecting front or rear vehicle misalignment using vehicle sensors.

Modern vehicles (e.g., a car, a motorcycle, a boat, or any other type of automobile) may be equipped with one or more cameras that provide back-up assistance, take images of the vehicle driver to determine driver drowsiness or attentiveness, provide images of the road as the vehicle is traveling for collision avoidance purposes, provide structure recognition (e.g., roadway signs, etc.), and/or the like. For example, a vehicle can be equipped with multiple cameras, and images from multiple cameras (referred to as "surround view cameras") can be used to create a "surround" or "bird's eye" view of the vehicle. Some of the cameras (referred to as "long-range cameras") can be used to capture long-range images (e.g., for object detection for collision avoidance, structure recognition, etc.).

Such vehicles can also be equipped with sensors, such as a radio detecting and ranging (RADAR) device(s), LiDAR device(s), and/or the like for perception tasks. LiDAR involves using light (e.g., a pulsed laser) to measure distance to objects by emitting laser pulses, detecting a reflection (e.g., off of an object) of the emitted laser pulse, and measuring the time between the emission and the detection. The measured time can be used to determine the distance between the LiDAR device and the detected object. Perception tasks can include one or more of object detection, classification, tracking, lane detection, road sign recognition, and obstacle avoidance. Perception tasks are particularly useful for an autonomous vehicle or semi-autonomous vehicle to provide the vehicle with real-time awareness of its environment to make safe and informed driving decisions. Images from the one or more cameras of the vehicle can also be used for detecting objects, tracking targets, and/or the like, including combinations and/or multiples thereof.

SUMMARY

In one embodiment, a method for detecting front or rear vehicle misalignment using a vehicle sensor of a vehicle is provided. The method includes determining whether the vehicle is in a misalignment detection state. The method further includes, responsive to determining that the vehicle is in the misalignment detection state, determining whether the vehicle is experiencing a misalignment. The method further includes, responsive to determining that the vehicle is experiencing the misalignment, classifying the misalignment as one of a front misalignment or a rear misalignment by comparing a vehicle heading angle to a vehicle motion angle, the vehicle motion angle being determined using sensor data received from the vehicle sensor. The method further includes performing an alignment mitigation action to mitigate negative effects of the misalignment on the vehicle.

In addition to one or more of the features described herein, or as an alternative, further embodiments of the method may include that the misalignment is classified as the front misalignment responsive to the vehicle heading angle being within a threshold difference of the vehicle motion angle.

In addition to one or more of the features described herein, or as an alternative, further embodiments of the method may include that no action is taken responsive to determining that the vehicle is not in the misalignment detection state.

In addition to one or more of the features described herein, or as an alternative, further embodiments of the method may include that the misalignment is classified as the rear misalignment responsive to the vehicle heading angle not being within a threshold difference of the vehicle motion angle.

In addition to one or more of the features described herein, or as an alternative, further embodiments of the method may include that the vehicle is in the misalignment detection state responsive to a speed of the vehicle being greater than a threshold, a lateral acceleration of the vehicle being substantially zero, and responsive to the vehicle traveling straight.

In addition to one or more of the features described herein, or as an alternative, further embodiments of the method may include that it is determined that the vehicle is experiencing the misalignment responsive to a steering wheel angle of a steering wheel of the vehicle being greater than a threshold.

In addition to one or more of the features described herein, or as an alternative, further embodiments of the method may include that the threshold is substantially zero.

In addition to one or more of the features described herein, or as an alternative, further embodiments of the method may include that the vehicle utilizes an active rear steering system.

In addition to one or more of the features described herein, or as an alternative, further embodiments of the method may include that performing the alignment mitigation action to mitigate negative effects of the misalignment on the vehicle comprises implementing an active rear steering remedial action responsive to classifying the misalignment as the rear misalignment.

In addition to one or more of the features described herein, or as an alternative, further embodiments of the method may include that implementing the active rear steering remedial action includes measuring steering angle during straight ahead driving, calculating a target rear road wheel angle offset during straight ahead driving, and applying the target rear road wheel angle offset to the active rear steering system using the sensor data collected by the vehicle sensor.

In another embodiment, a vehicle is provided. The vehicle includes a vehicle sensor, an active rear steering system, and a processing system. The processing system includes a memory having computer readable instructions and a processing device for executing the computer readable instructions, the computer readable instructions controlling the processing device to perform operations for detecting front or rear vehicle misalignment using the vehicle sensor of the vehicle. The operations include determining whether the vehicle is in a misalignment detection state. The operations further include, responsive to determining that the vehicle is in the misalignment detection state, determining whether the vehicle is experiencing a misalignment. The operations further include, responsive to determining that the vehicle is experiencing the misalignment, classifying the misalignment as one of a front misalignment or a rear misalignment by comparing a vehicle heading angle to a vehicle motion angle, the vehicle motion angle being determined using sensor data received from the vehicle sensor. The operations further include causing the active rear steering system to perform an alignment mitigation action to mitigate negative effects of the misalignment on the vehicle.

In addition to one or more of the features described herein, or as an alternative, further embodiments of the vehicle may include that the misalignment is classified as the front misalignment responsive to the vehicle heading angle being within a threshold difference of the vehicle motion angle.

In addition to one or more of the features described herein, or as an alternative, further embodiments of the vehicle may include that no action is taken responsive to determining that the vehicle is not in the misalignment detection state.

In addition to one or more of the features described herein, or as an alternative, further embodiments of the vehicle may include that the misalignment is classified as the rear misalignment responsive to the vehicle heading angle not being within a threshold difference of the vehicle motion angle.

In addition to one or more of the features described herein, or as an alternative, further embodiments of the vehicle may include that the vehicle is in the misalignment detection state responsive to a speed of the vehicle being greater than a threshold, a lateral acceleration of the vehicle being substantially zero, and responsive to the vehicle traveling straight.

In addition to one or more of the features described herein, or as an alternative, further embodiments of the vehicle may include that it is determined that the vehicle is experiencing the misalignment responsive to a steering wheel angle of a steering wheel of the vehicle being greater than a threshold, wherein the threshold is substantially zero.

In addition to one or more of the features described herein, or as an alternative, further embodiments of the vehicle may include that performing the alignment mitigation action to mitigate negative effects of the misalignment on the vehicle comprises implementing an active rear steering remedial action responsive to classifying the misalignment as the rear misalignment.

In addition to one or more of the features described herein, or as an alternative, further embodiments of the vehicle may include that implementing the active rear steering remedial action includes measuring steering angle during straight ahead driving, calculating a target rear road wheel angle offset during straight ahead driving, and applying the target rear road wheel angle offset to the active rear steering system using the sensor data collected by the vehicle sensor.

In addition to one or more of the features described herein, or as an alternative, further embodiments of the vehicle may include that the vehicle sensor is a camera.

In another embodiment a computer program product is provided. The computer program product includes a computer readable storage medium having program instructions embodied therewith, the program instructions executable by at least one processor to cause the at least one processor to perform operations for detecting front or rear vehicle misalignment using a vehicle sensor of the vehicle. The operations include determining whether the vehicle is in a misalignment detection state. The operations further include, responsive to determining that the vehicle is in the misalignment detection state, determining whether the vehicle is experiencing a misalignment. The operations further include, responsive to determining that the vehicle is experiencing the misalignment, classifying the misalignment as one of a front misalignment or a rear misalignment by comparing a vehicle heading angle to a vehicle motion angle, the vehicle motion angle being determined using sensor data received from the vehicle sensor. The operations further include causing an active rear steering system of the vehicle to perform an alignment mitigation action to mitigate negative effects of the misalignment on the vehicle.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
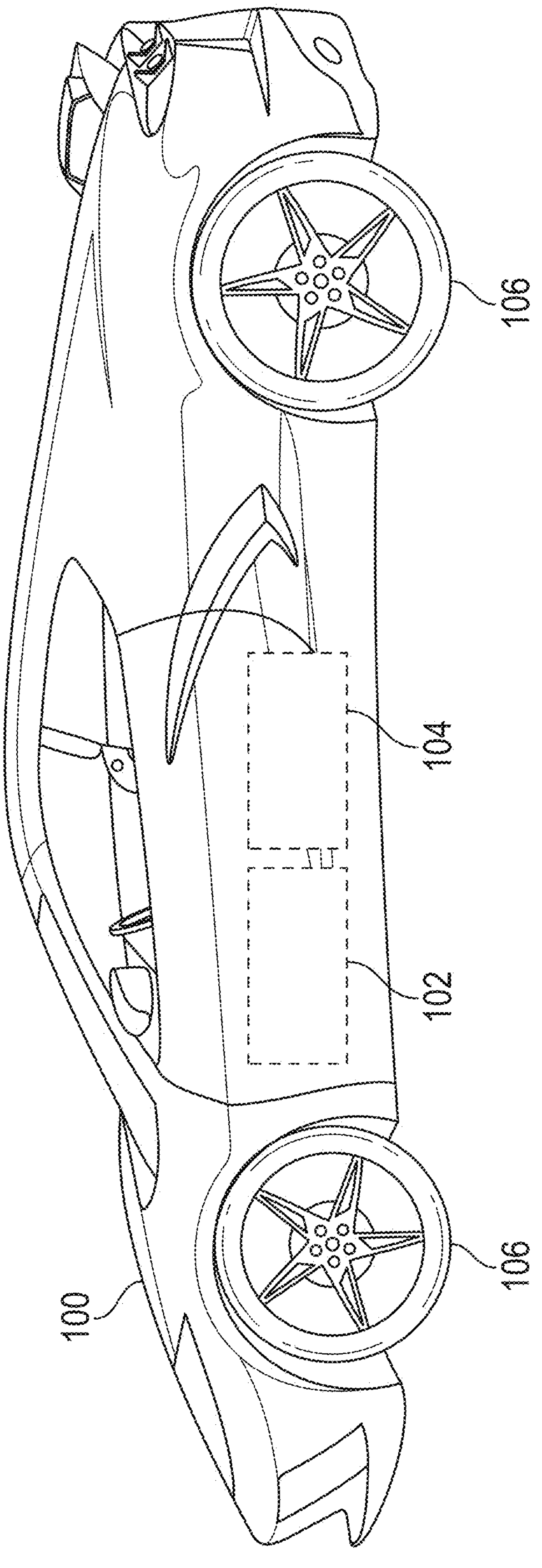
FIG. 1 is an illustration of a vehicle having a processing system for detecting front or rear vehicle misalignment using vehicle sensors according to one or more embodiments.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

One or more embodiments described herein relates to detecting front or rear vehicle misalignment using vehicle sensors.

Vehicles may use advanced driver assistance systems (ADASs) to improve vehicle performance and enhance driving comfort by providing automating, adapting, or enhancing vehicle systems to provide better awareness, decision-making, and control.

One example of an ADAS is adaptive cruise control (ACC) system, which automatically adjusts the velocity of a host vehicle to maintain a safe following distance from another vehicle ahead of the host vehicle. Another example of an ADAS is an automated lane change (ALC) system to cause the host vehicle to perform a lane change. Another example of an ADAS is a front collision alert (FCA) system to generate an alert to an operator of the host vehicle warning of a potential front collision. Another example of an ADAS is a collision imminent braking (CIB) system to apply brakes of the host vehicle to reduce a velocity of the host vehicle. Another example of an ADS is an automated evasive steering (AES) system to adjust the trajectory of the host vehicle.

ADASs often use data (referred to as "sensor data") from sensors (e.g., RADAR sensors, LiDAR sensor, proximity sensors, etc.), images from cameras, and/or the like, including combinations and/or multiples thereof, to make decisions and control one or more aspects of the vehicle.

One or more embodiments described herein utilize vehicle sensors, such as those sensors associated with ADASs, to perform detecting front or rear vehicle misalignment. A vehicle can be misaligned due to various steering failures. For example, if a rear suspension component of a vehicle is damaged while the vehicle is being driven, the misalignment of the rear suspension causes a "dog-tracking" behavior in which a heading angle of the vehicle (referred to as a "vehicle heading angle") is different than the direction the vehicle is moving (referred to as a "vehicle motion angle"). In a severe case, this could be considered a degradation of lateral motion control for both chassis and active safety control. One or more embodiments described herein address this shortcoming by detecting the misalignment of the vehicle, quantifying the severity of the misalignment, and identifying the misalignment as a front misalignment or a rear misalignment. The term "misalignment" refers to the incorrect positioning of one or more wheels of a vehicle relative to the other wheels of the vehicle. Proper wheel alignment ensures that the vehicle drives straight and true, maximizing tire life and ensuring optimal handling and ride quality/comfort. Misalignment can result from normal driving wear and tear, from hitting potholes or curbs, from collisions with other vehicles, and/or the like, including combinations and/or multiples thereof.

According to one or more embodiments, the difference between the vehicle heading angle and the vehicle motion angle is determined utilizing standard vehicle sensors, such as those sensors often associated or affiliated with ADASs. One or more embodiments provides for effectively detecting misalignment and providing serviceable action and controls mitigation for robustness of vehicle control.

It should be appreciated that the functioning of a vehicle implementing one or more of the embodiments described herein is improved. For example, by detecting and classifying misalignment (e.g., front misalignment or rear misalignment), operation of the vehicle is improved by mitigating negative effects caused by the misalignment. For example, in the case where a vehicle includes an active rear steering system, the active rear steering can be adjusted to account for the misalignment. More particularly, the active rear steering can be "re-zeroed" by calculating and implementing a target rear road wheel angle offset during straight ahead driving conditions. This reduces or eliminates the undesirable "dog tracking" behavior caused by rear misalignment. Other benefits and advantages are also apparent to persons having ordinary skill in the art.

FIG. 1 is an illustration of a vehicle 100 having a processing system 102 for detecting front or rear vehicle misalignment using vehicle sensor(s) 104 according to one or more embodiments. As described herein, misalignment refers to the incorrect positioning of one or more wheels 106 of the vehicle 100 relative to the other wheels 106 of the vehicle.

The vehicle 100 can be a car, a truck, a van, a bus, a motorcycle, a boat, or any other type of automobile. According to an embodiment, the vehicle 100 includes an internal combustion engine fueled by gasoline, diesel, or the like. According to another embodiment, the vehicle 100 is a hybrid electric vehicle partially or wholly powered by electrical power. According to another embodiment, the vehicle 100 is an electric vehicle powered by electrical power. According to one or more embodiments, the vehicle 100 is an autonomous or semi-autonomous vehicle. An autonomous vehicle is a vehicle that has self-driving capabilities. A semi-autonomous vehicle is a vehicle that has certain autonomous features (e.g., self-parking, lane keeping, etc.) but lacks full autonomous control.

According to one or more embodiments, the vehicle 100 includes the processing system 102. The processing system 102 can use data (e.g., sensor data 212 shown in FIG. 2) received from sensor(s) 104 to detect front or rear vehicle misalignment of the vehicle 100. The sensor(s) 104 can be any suitable sensor(s) to gather data about its environment and transmit the data to another device, system, cloud-based service, and/or the like, including combinations and/or multiples thereof, such as the processing system 102. Non-limiting examples of the sensor(s) 104 include a camera, a RADAR device, a LiDAR device, and/or the like, including combinations and/or multiples thereof.

According to one or more embodiments, the processing system 102 can also include vehicle device(s) 214 which collect vehicle data 216. The misalignment detection engine 210 utilizes the vehicle data 216 to detect front or rear vehicle misalignment in one or more embodiments. The vehicle device(s) 214 can include one or more of any suitable device, component, or system that may be included in or otherwise associated with the vehicle 100. Non-limiting examples of the vehicle device(s) 214 include one or more of a front control module (FCM), a global positioning system (GPS), a wheel speed sensor (WSS), an inertial measurement unit (IMU), a steering angle sensor (SAS), an active rear steering (ARS) system, an electric power steering (EPS) system, and/or the like, including combinations and/or multiples thereof. The vehicle data 216 can include data from one or more of the vehicle device(s) 214 and/or data from another source. For example, the sensor data 212 can include one or more of the following non-limiting data: road straightness/curvature indication (e.g., from a high definition (HD) map), lateral velocity from lane markings, heading and curvature information, vehicle heading information, differential odometry information, steering torque conditions, map bank angles (e.g., from an HD map), IMU bank angle, and/or the like, including combinations and/or multiples thereof.

The misalignment detection engine 210 can monitor alignment observer excitation criteria (e.g., lateral acceleration equal to zero with non-zero steering wheel angle), calculate an expected vehicle heading, estimate an alignment error, apply statistical filters (e.g., moving average), and detect misalignment (e.g., whether misalignment exists and whether such misalignment is front misalignment or rear misalignment).

According to one or more embodiments, the vehicle 100 may be equipped with ARS. If the vehicle 100 has any wheel misalignment and is equipped with the ARS system, the ARS system may not adapt to a non-zero steering angle sensor (SAS) value used to drive in a straight line and will induce a road wheel actuator (RWA) change that could cause an unintended path deviation. Because the ARS system changes is RWA based on vehicle speed and SAS, the SAS value to maintain a straight path in the case where one or more of the wheels 106 is misaligned will also change with vehicle speed. In such cases, the driver (or autonomous system) may be required to change the steering wheel angle to drive straight when changing vehicle speeds. Chassis control systems that consume the SAS value to maintain a straight path must also continuously adapt to changing SAS values. If such adaptation occurs too rapidly, the chassis control system may experience a failure. Front steering features, such as active return, also work against driver input due to the ARS misalignment behavior. Accordingly, it is desirable to detect misalignment as described herein.

Further features of the processing system 102 are now described with reference to FIGS. 2-7.

Figure 2:
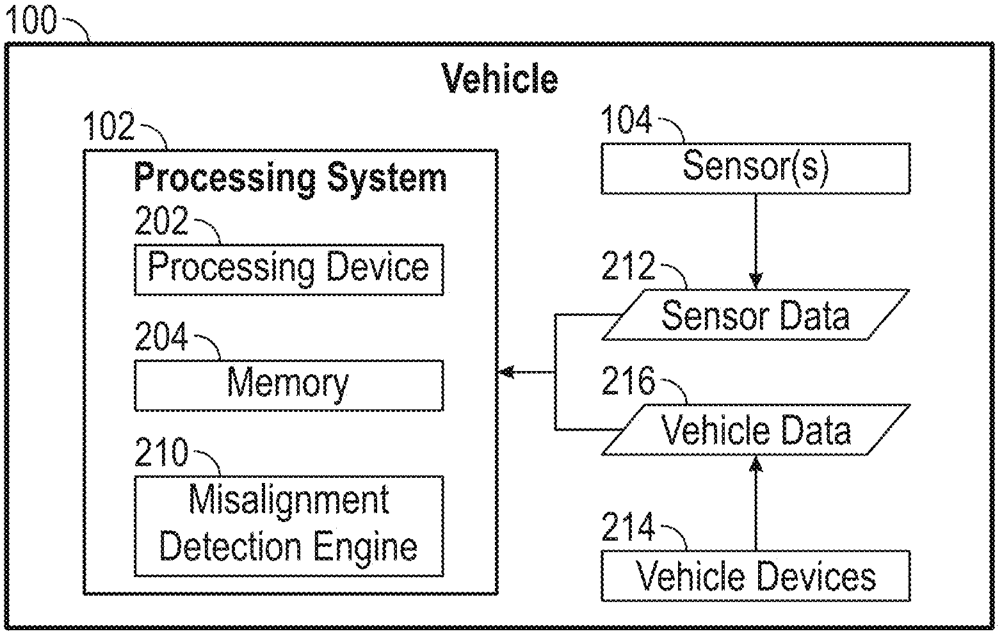
FIG. 2 is a block diagram of the processing system of FIG. 1 for detecting front or rear vehicle misalignment using vehicle sensors according to one or more embodiments.

Particularly, FIG. 2 is a block diagram of the processing system 102 of FIG. 1 for detecting front or rear vehicle misalignment using vehicle sensor(s) 104 according to one or more embodiments. The processing system 102 includes a processing device 202, a memory 204, and a misalignment detection engine 210. It should be appreciated that the processing system 102 can be any device suitable for detecting front or rear vehicle misalignment using vehicle sensor(s) 104. For example, the processing system 102 can be a device implemented in or otherwise associated with the vehicle 100. As another example, the processing system 102 can be a smartphone, tablet computer, laptop computer, desktop computer, wearable computing device, and/or the like, including combinations and/or multiples thereof.

The processing device 202 is any suitable processing circuitry for processing data (e.g., sensor data 212) and/or instructions. The processing device 202 is an example of one or more of the processing devices 721 of FIG. 7, as described in more detail herein.

The memory 204 is any suitable device for storing data and/or instructions. The memory 204 is an example of one or more of the system memory 722, the random access memory 723, and/or the read-only memory 724 of FIG. 7, as described in more detail herein.

The misalignment detection engine 210 provides cybersecurity for detecting front or rear vehicle misalignment using vehicle sensor(s) 104, as described in more detail herein. According to one or more embodiments, the misalignment detection engine 210 uses sensor data 212 from the sensor(s) 104 to detecting front or rear vehicle misalignment for the vehicle 100.

The misalignment detection engine 210 provides real-time and fast detection of a front or rear vehicle misalignment during straight ahead driving conditions by using sensor(s) 104, such as camera(s) associated with an ADAS, to determine a difference between the vehicle heading angle and the vehicle motion angle. If a rear misalignment is present, there is a threshold difference between the vehicle heading angle and the vehicle motion angle while the vehicle 100 is driving in a substantially straight line, which causes the dog-tracking behavior as described herein. If a front misalignment is present, there is no threshold difference between the vehicle heading angle and the vehicle motion angle while the vehicle 100 is driving in a substantially straight line. A "threshold difference" is a difference that is greater than a threshold. For example, in the case of comparing the vehicle heading angle and the vehicle motion angle, a threshold difference may be a difference expressed as a percentage, a total angular amount, or another measure. For example, the threshold difference may be 1%, 1 degree, and/or the like, including combinations and/or multiples thereof. The misalignment detection engine 210 can determine misalignment holistically that is caused by various factors, such as suspension, axle, or steering, without relying on steering information.

Further aspects and features of the misalignment detection engine 210 are described herein with respect to FIGS. 3-7.

The various components, modules, engines, etc. described regarding FIG. 2 (e.g., the misalignment detection engine 210) can be implemented as instructions stored on a computer-readable storage medium, as hardware modules, as special-purpose hardware (e.g., application specific hardware, application specific integrated circuits (ASICs), application specific special processors (ASSPs), field programmable gate arrays (FPGAs), as embedded controllers, hardwired circuitry, etc.), or as some combination or combinations of these. According to aspects of the present disclosure, the engine(s) described herein can be a combination of hardware and programming. The programming can be processor executable instructions stored on a tangible memory, and the hardware can include the processing device 202 for executing those instructions. Thus, a system memory (e.g., memory 204) can store program instructions that, when executed by the processing device 202, implement the engines described herein. Other engines can also be utilized to include other features and functionality described in other examples herein.

Figure 3:
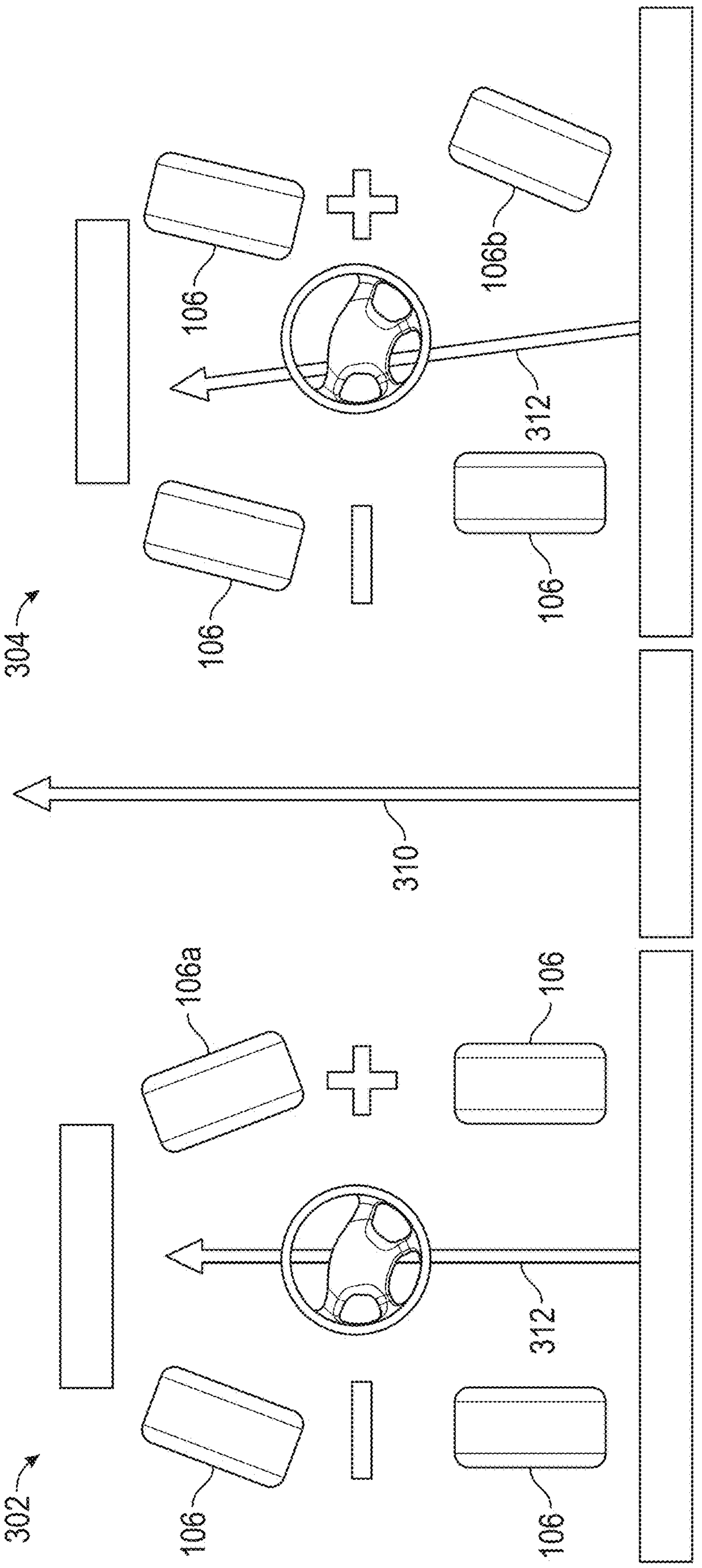
FIG. 3 is a diagram showing front misalignment and rear misalignment of a vehicle according to one or more embodiments.

FIG. 3 is a diagram showing front misalignment 302 and rear misalignment 304 of the vehicle 100 according to one or more embodiments. In this example, the wheels 106 of the vehicle 100 are shown. In the case of the front misalignment 302, the wheel **106*a* is misaligned relative to the wheels 106. In the case of the rear misalignment 304, the wheel 106*b* is misaligned relative to the wheels 106. To determine whether the vehicle is experiencing a front misalignment 302 or a rear misalignment 304, the misalignment detection engine 210 compares the vehicle motion angle 310 to the vehicle heading angle 312. The vehicle motion angle 310 is determined using the sensor data 212 received from the vehicle sensor(s) 104. For example, a camera(s) can capture images of the road and can determine the vehicle motion angle 310 from the images, such as by extracting features from multiple frames of a video captured by the camera and processing the frames to determine the vehicle motion angle 310 relative to the road upon which the vehicle is traveling. If the vehicle motion angle 310 and the vehicle heading angle 312 are in agreement (e.g., are within a threshold difference, such as within 1%, 1 degree, and/or the like, including combinations and/or multiples thereof), the vehicle heading angle 312 is considered to match or be equivalent to the vehicle motion angle 310, which indicates the front misalignment 302. If, however, the vehicle motion angle 310 and the vehicle heading angle 312 are not in agreement (e.g., are not within the threshold difference), the vehicle heading angle 312 is not considered to match or be equivalent to the vehicle motion angle 310, which indicates the rear misalignment 304**.

Figure 4:
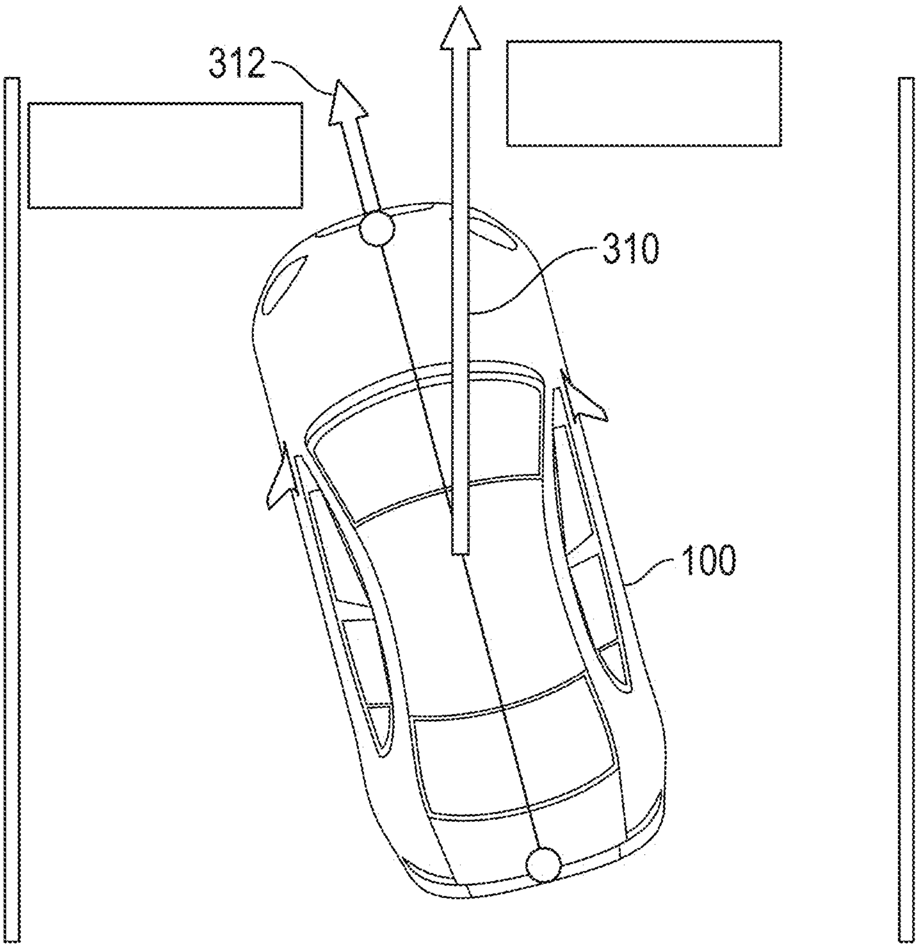
FIG. 4 is a diagram comparing vehicle motion angle and vehicle heading angle for a vehicle according to one or more embodiments.

FIG. 4 is a diagram comparing the vehicle motion angle 310 and the vehicle heading angle 312 for the vehicle 100 according to one or more embodiments. In this embodiment, the vehicle motion angle 310 and the vehicle heading angle 312 are considered not to be in agreement (e.g., are not within the threshold difference), which indicates the rear misalignment 304.

Figure 5:
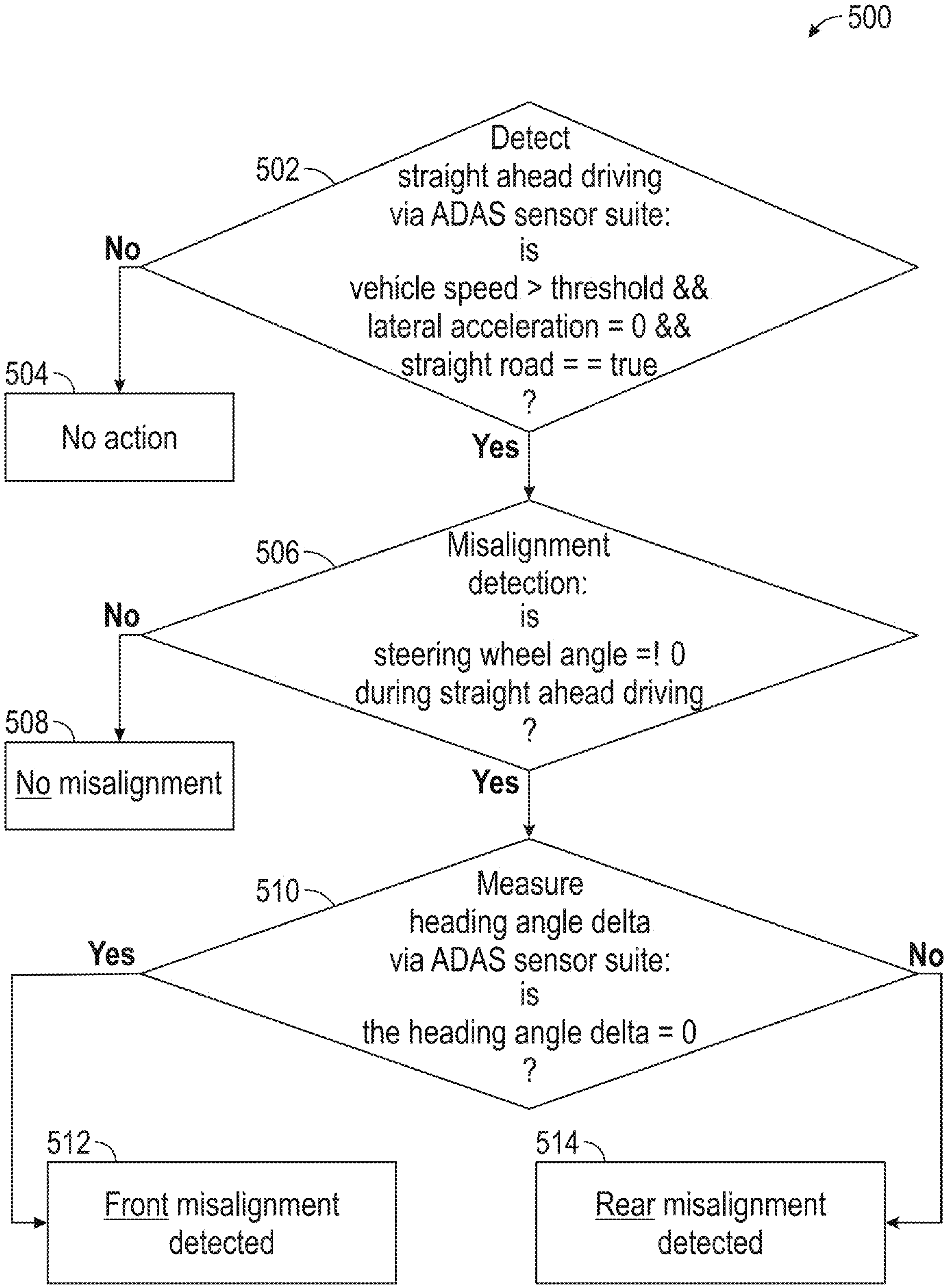
FIG. 5 is a flow diagram of a method for detecting front or rear vehicle misalignment using vehicle sensors according to one or more embodiments.

FIG. 5 is a flow diagram of a method 500 for detecting front or rear vehicle misalignment using vehicle sensors according to one or more embodiments. The method 500 can be implemented using any suitable system or device. For example, the method 500 can be implemented using the processing system 102 of FIGS. 1 and 2, by the processing system 700 of FIG. 7, and/or the like, including combinations and/or multiples thereof. The method 500 is now described with reference to FIGS. 1 and 2 but is not so limited. The method 500 is useful for vehicles that do not implement ARS, for example, but is not so limited.

At block 502, the misalignment detection engine 210 detects that the vehicle 100 is being driven straight ahead using the sensor data 212 from the sensor(s) 104 (e.g., sensors associated with one or more ADAS). The misalignment detection engine 210 also determines whether the speed of the vehicle 100 is greater than a threshold and whether the lateral acceleration of the vehicle is substantially zero and whether the vehicle 100 is traveling straight (e.g., whether the road upon which the vehicle 100 is operating is a substantial straight road, whether the vehicle path is substantially straight). The speed of the vehicle 100 can be determined using telemetry data received from an electronic control system of the vehicle, using global positioning system (GPS) data, using data received from a wheel speed sensor, and/or the like, including combinations and/or multiples thereof, for example. The lateral acceleration can be determined using data from an inertial measurement unit (IMU) of the vehicle, for example. The road straightness can be determined using imaging information extracted from the sensor data 212 from the sensor(s) 104 (e.g., a camera), from map data from a navigation system of the vehicle 100, and/or the like, including combinations and/or multiples thereof. If any of these conditions are not satisfied (e.g., the vehicle speed is not greater than the threshold, the lateral acceleration is not substantially zero, or the road is not a straight road), the method 500 proceeds to block 504, where no action is taken. However, if these three conditions are each true, the method 500 proceeds to block 506.

At block 506, the misalignment detection engine 210 performs misalignment detection. For example, the misalignment engine determines whether the steering wheel angle of a steering wheel of the vehicle 100 is below a threshold. According to one or more embodiments, the threshold is substantially zero such that the misalignment detection engine 210 determines whether the steering angle of the steering wheel is substantially zero. If the steering wheel angle is less than the threshold, the misalignment detection engine 210 determines that no misalignment exists for the vehicle 100 at block 508. If, however, the steering wheel angle is not less than the threshold at block 506, the method 500 proceeds to block 510.

At block 510, the misalignment detection engine 210 compares the vehicle motion angle 310 and the vehicle heading angle 312. That is, the misalignment detection engine 210 determines whether the heading angle of the vehicle 100 (e.g., the vehicle heading angle 312) is different than the direction the vehicle 100 is moving (e.g., the vehicle motion angle 310). Using the results of the comparison, the misalignment detection engine 210 determines whether the misalignment is a front misalignment (block 512) or whether the misalignment is a rear misalignment (block 514). If a front misalignment is present (block 512), there is no threshold difference between the vehicle heading angle 312 and the vehicle motion angle 310 while the vehicle 100 is driving in a substantially straight line. If a rear misalignment is present (block 514), there is a threshold difference between the vehicle heading angle 312 and the vehicle motion angle 310 while the vehicle 100 is driving in a substantially straight line, which causes the dog-tracking behavior as described herein.

According to one or more embodiments, once the misalignment detection is classified as being front misalignment (block 512) or rear misalignment (block 514), an alignment mitigation action can be performed to mitigate negative effects of the misalignment on the vehicle. For example, the vehicle 100 can undergo a realignment of the wheels 106, one or more systems of the vehicle 100 can implement corrective action during driving (e.g., limit vehicle speed, adjust a dynamic suspension system, and/or the like, including combinations and/or multiples thereof).

Additional processes also may be included, and it should be understood that the processes depicted in FIG. 5 represent illustrations, and that other processes may be added, or existing processes may be removed, modified, or rearranged without departing from the scope of the present disclosure. It should also be understood that the processes depicted in FIG. 5 may be implemented as programmatic instructions stored on a non-transitory computer-readable storage medium that, when executed by a processor (e.g., the processing device 202 of FIG. 2, the processor(s) 721 of FIG. 7, and/or the like, including combinations and/or multiples thereof) of a computing system (e.g., the processing system 102 of FIGS. 1 and 2, the processing system 700 of FIG. 7, and/or the like, including combinations and/or multiples thereof), cause the processor to perform the processes described herein.

Figure 6:
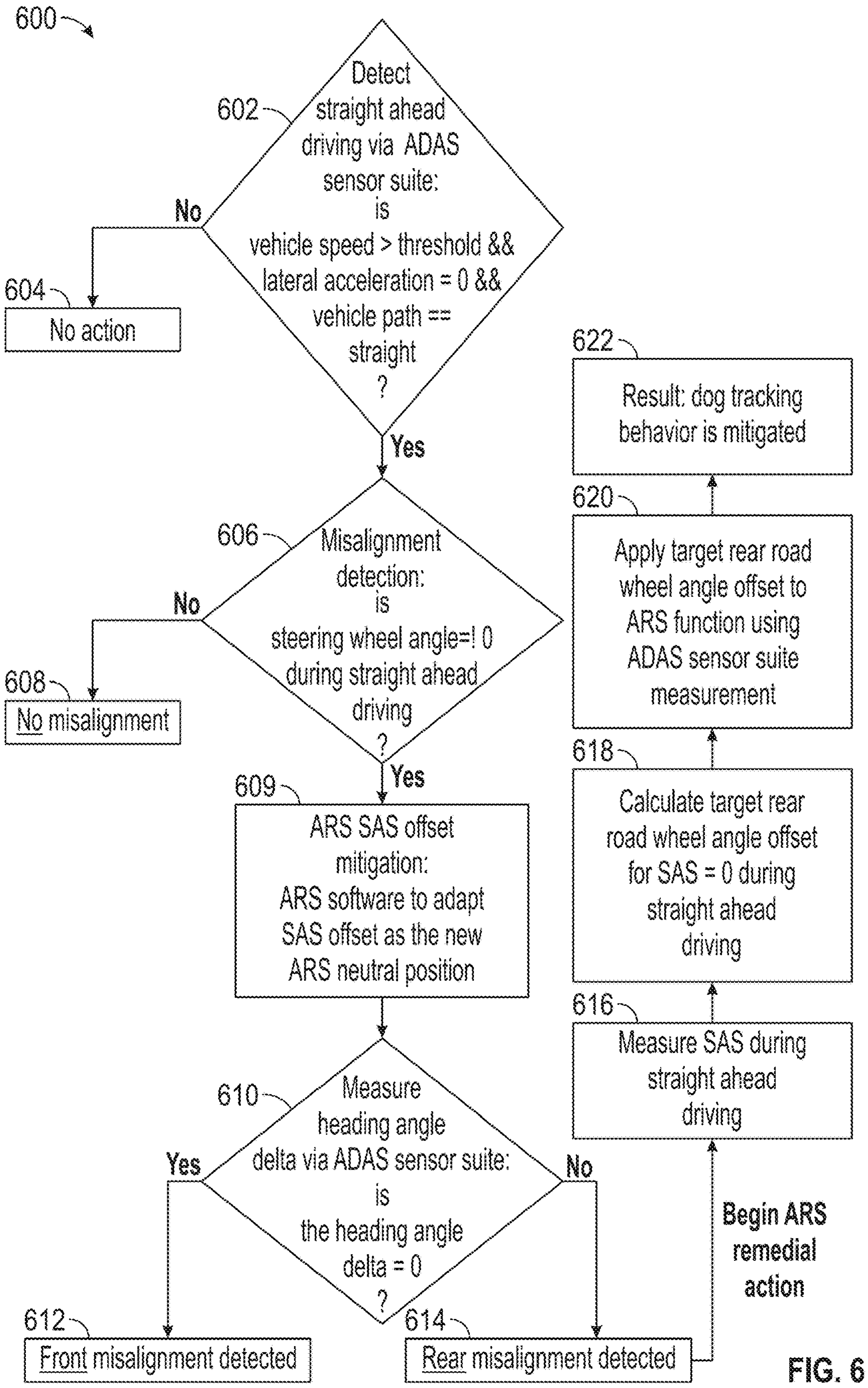
FIG. 6 is a flow diagram of a method for detecting front or rear vehicle misalignment using vehicle sensors according to one or more embodiments.

FIG. 6 is a flow diagram of a method 600 for detecting front or rear vehicle misalignment using vehicle sensors according to one or more embodiments. The method 600 can be implemented using any suitable system or device. For example, the method 600 can be implemented using the processing system 102 of FIGS. 1 and 2, by the processing system 700 of FIG. 7, and/or the like, including combinations and/or multiples thereof. The method 600 is now described with reference to FIGS. 1 and 2 but is not so limited. The method 600 is useful for vehicles that implement ARS, for example, but is not so limited.

At block 602, the misalignment detection engine 210 detects that the vehicle 100 is being driven straight ahead using the sensor data 212 from the sensor(s) 104 (e.g., sensors associated with one or more ADAS). The misalignment detection engine 210 also determines whether the speed of the vehicle 100 is greater than a threshold and whether the lateral acceleration of the vehicle is substantially zero and whether the vehicle 100 is traveling straight (e.g., whether the road upon which the vehicle 100 is operating is a substantial straight road, whether the vehicle path is substantially straight). The speed of the vehicle 100 can be determined using telemetry data received from an electronic control system of the vehicle, using global positioning system (GPS) data, using data received from a wheel speed sensor, and/or the like, including combinations and/or multiples thereof, for example. The lateral acceleration can be determined using data from an inertial measurement unit (IMU) of the vehicle, for example. The road straightness can be determined using imaging information extracted from the sensor data 212 from the sensor(s) 104 (e.g., a camera), from map data from a navigation system of the vehicle 100, and/or the like, including combinations and/or multiples thereof. If any of these conditions are not satisfied (e.g., the vehicle speed is not greater than the threshold, the lateral acceleration is not substantially zero, or the road is not a straight road), the method 600 proceeds to block 604, where not action is taken. However, if these three conditions are each true, the method 600 proceeds to block 606.

At block 606, the misalignment detection engine 210 performs misalignment detection. For example, the misalignment engine determines whether the steering wheel angle of a steering wheel of the vehicle 100 is below a threshold. According to one or more embodiments, the threshold is substantially zero such that the misalignment detection engine 210 determines whether the steering angle of the steering wheel is substantially zero. If the steering wheel angle is less than the threshold, the misalignment detection engine 210 determines that no misalignment exists for the vehicle 100 at block 608. If, however, the steering wheel angle is not less than the threshold at block 606, the method 600 proceeds to block 609.

At block 609, the method 600 includes performing ARS SAS offset mitigation. In particular, the ARS system adapts an SAS offset, which is used as a new ARS neutral position. To do this, the misalignment detection engine 210 calculates an SAS difference, which is based on a measured rear road wheel angle and a front steering ratio (e.g., the measured rear road wheel angle multiplied by the front steering ratio). Next, the misalignment detection engine 210 calculates the SAS offset as a moving average based on the measured steering wheel angle and the SAS difference (e.g., measured steering wheel angle minus the SAS difference). Finally, the misalignment detection engine 210 adapts the ARS system using the SAS offset. More particularly, the ARS system consumes SAS=0 when the steering wheel angle is equal to the SAS offset (e.g., non-zero). The method 600 then proceeds to block 610.

At block 610, the misalignment detection engine 210 compares the vehicle motion angle 310 and the vehicle heading angle 312. That is, the misalignment detection engine 210 determines whether the heading angle of the vehicle 100 (e.g., the vehicle heading angle 312) is different than the direction the vehicle 100 is moving (e.g., the vehicle motion angle 310). Using the results of the comparison, the misalignment detection engine 210 determines whether the misalignment is a front misalignment (block 612) or whether the misalignment is a rear misalignment (block 614). If a front misalignment is present (block 612), there is no threshold difference between the vehicle heading angle 312 and the vehicle motion angle 310 while the vehicle 100 is driving in a substantially straight line. If a rear misalignment is present (block 614), there is a threshold difference between the vehicle heading angle 312 and the vehicle motion angle 310 while the vehicle 100 is driving in a substantially straight line, which causes the dog-tracking behavior as described herein.

Responsive to detecting a rear misalignment (block 614), the method 600 proceeds to implement an ARS remedial action, which is an example of an alignment mitigation action. The method 600 proceeds to block 616. At block 616, the misalignment detection engine 210 measures the SAS during straight ahead driving. At block 618, the misalignment detection engine 210 calculates a target rear road wheel angle offset for SAS=0 (e.g., the SAS indicates a substantially 0 degree angle) during straight ahead driving. In particular, the misalignment detection engine 210 calculates the target rear road wheel angle offset based on the steering wheel angle and the front steering ratio (e.g., the steering wheel angle divided by the front steering ratio). Then, the ARS system is adapted using the target road wheel angle offset. Particular, the ARS system subtracts the target rear road wheel angle offset from the ARS position calculation. At block 620, the misalignment detection engine 210 applies the target rear road wheel angle offset to the ARS system (e.g., one of the vehicle device(s) 214) using the sensor data 214. At block 622, the dog tracking behavior is mitigated.

Additional processes also may be included, and it should be understood that the processes depicted in FIG. 6 represent illustrations, and that other processes may be added, or existing processes may be removed, modified, or rearranged without departing from the scope of the present disclosure.

Figure 7:
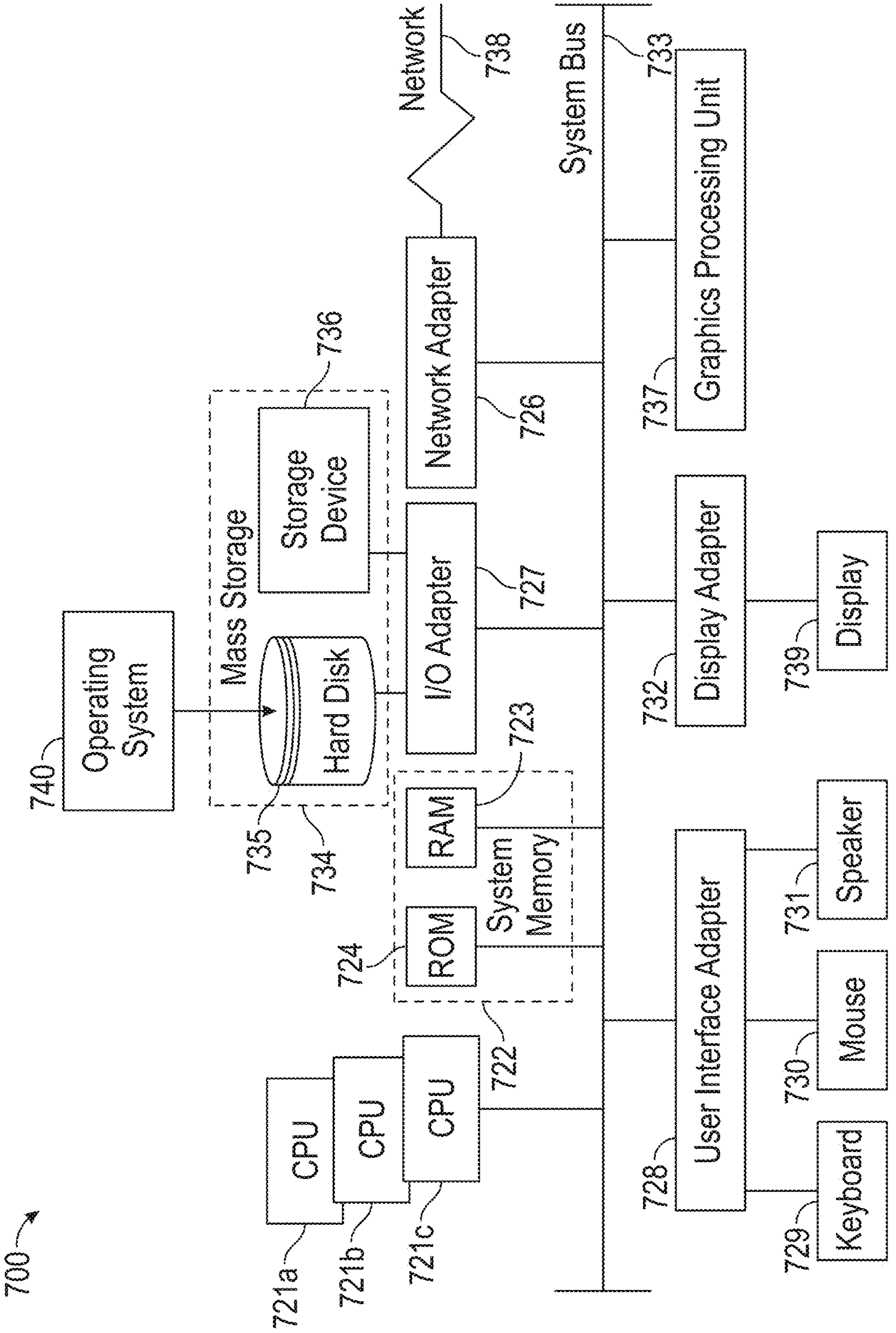
FIG. 7 is a block diagram of a processing system for implementing one or more embodiments described herein.

It should also be understood that the processes depicted in FIG. 6 may be implemented as programmatic instructions stored on a non-transitory computer-readable storage medium that, when executed by a processor (e.g., the processing device 202 of FIG. 2, the processor(s) 721 of FIG. 7, and/or the like, including combinations and/or multiples thereof) of a computing system (e.g., the processing system 102 of FIGS. 1 and 2, the processing system 700 of FIG. 7, and/or the like, including combinations and/or multiples thereof), cause the processor to perform the processes described herein.

It is understood that one or more embodiments described herein is capable of being implemented in conjunction with any other type of computing environment now known or later developed. For example, FIG. 7 depicts a block diagram of a processing system 700 for implementing the techniques described herein. In accordance with one or more embodiments described herein, the processing system 700 is an example of a cloud computing node of a cloud computing environment. In examples, processing system 700 has one or more central processing units (referred to also as "processors" or "processing resources" or "processing devices") 721*a*, 721*b*, 721*c*, etc. (collectively or generically referred to as processor(s) 721 and/or as processing device(s)). In aspects of the present disclosure, each processor 721 can include a reduced instruction set computer (RISC) microprocessor. Processors 721 are coupled to a system memory 722 and/or various other components via a system bus 733. The system memory 722 can include one or more temporary and/or persistent memory devices, such as a random access memory (RAM) 723, a read-only memory (ROM) 724, and/or the like, including combinations and/or multiples thereof. The system bus 733 may include a basic input/output system (BIOS), which controls certain basic functions of processing system 700.

Further depicted are an input/output (I/O) adapter 727 and a network adapter 726 coupled to system bus 733. I/O adapter 727 may be a small computer system interface (SCSI) adapter that communicates with a hard disk 735 and/or a storage device 736 or any other similar component. I/O adapter 727, hard disk 735, and storage device 736 are collectively referred to herein as mass storage 734. Operating system 740 for execution on processing system 700 may be stored in mass storage 734. The network adapter 726 interconnects system bus 733 with an outside network 738 enabling processing system 700 to communicate with other such systems.

A display (e.g., a display monitor) 739 is connected to system bus 733 by display adapter 732, which may include a graphics adapter to improve the performance of graphics intensive applications and a video controller. In one aspect of the present disclosure, adapters 726, 727, and/or 732 may be connected to one or more I/O buses that are connected to system bus 733 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 733 via user interface adapter 728 and display adapter 732. A keyboard 729, mouse 730, and speaker 731 may be interconnected to system bus 733 via user interface adapter 728, which may include, for example, a Super I/O chip integrating multiple device adapters into a single integrated circuit.

In some aspects of the present disclosure, processing system 700 includes a graphics processing unit (GPU) 737. Graphics processing unit 737 is a specialized electronic circuit designed to manipulate and alter memory to accelerate the creation of images in a frame buffer intended for output to a display. In general, graphics processing unit 737 is very efficient at manipulating computer graphics and image processing, and has a highly parallel structure that makes it more effective than general-purpose CPUs for algorithms where processing of large blocks of data is done in parallel.

Thus, as configured herein, processing system 700 includes processing capability in the form of processors 721, storage capability including the system memory 722 and mass storage 734, input means such as keyboard 729 and mouse 730, and output capability including speaker 731 and display 739. In some aspects of the present disclosure, a portion of system memory 722 and mass storage 734 collectively store the operating system 740 to coordinate the functions of the various components shown in processing system 700.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A computer-implemented method for detecting front or rear vehicle misalignment using a vehicle sensor of a vehicle, the method comprising:

determining whether the vehicle is in a misalignment detection state;

responsive to determining that the vehicle is in the misalignment detection state, determining whether the vehicle is experiencing a misalignment;

responsive to determining that the vehicle is experiencing the misalignment, classifying the misalignment as one of a front misalignment or a rear misalignment by comparing a vehicle heading angle to a vehicle motion angle, the vehicle motion angle being determined using sensor data received from the vehicle sensor; and performing an alignment mitigation action to mitigate negative effects of the misalignment on the vehicle, wherein the vehicle utilizes an active rear steering system.

2. The computer-implemented method of claim 1, wherein the misalignment is classified as the front misalignment responsive to the vehicle heading angle being within a threshold difference of the vehicle motion angle.

3. The computer-implemented method of claim 2, wherein no action is taken responsive to determining that the vehicle is not in the misalignment detection state.

4. The computer-implemented method of claim 1, wherein the misalignment is classified as the rear misalignment responsive to the vehicle heading angle not being within a threshold difference of the vehicle motion angle.

5. The computer-implemented method of claim 1, wherein the vehicle is in the misalignment detection state responsive to a speed of the vehicle being greater than a threshold, a lateral acceleration of the vehicle being substantially zero, and responsive to the vehicle traveling straight.

6. The computer-implemented method of claim 1, wherein it is determined that the vehicle is experiencing the misalignment responsive to a steering wheel angle of a steering wheel of the vehicle being greater than a threshold.

7. The computer-implemented method of claim 6, wherein the threshold is substantially zero.

8. The computer-implemented method of claim 1, wherein performing the alignment mitigation action to mitigate negative effects of the misalignment on the vehicle comprises implementing an active rear steering remedial action responsive to classifying the misalignment as the rear misalignment.

9. The computer-implemented method of claim 8, wherein implementing the active rear steering remedial action comprises:

measuring steering angle during straight ahead driving;

calculating a target rear road wheel angle offset during straight ahead driving; and applying the target rear road wheel angle offset to the active rear steering system using the sensor data collected by the vehicle sensor.

10. A vehicle comprising:

a vehicle sensor;

an active rear steering system; and a processing system, the processing system comprising:

a memory comprising computer readable instructions; and a processing device for executing the computer readable instructions, the computer readable instructions controlling the processing device to perform operations for detecting front or rear vehicle misalignment using the vehicle sensor of the vehicle, the operations comprising:

determining whether the vehicle is in a misalignment detection state;

responsive to determining that the vehicle is in the misalignment detection state, determining whether the vehicle is experiencing a misalignment;

responsive to determining that the vehicle is experiencing the misalignment, classifying the misalignment as one of a front misalignment or a rear misalignment by comparing a vehicle heading angle to a vehicle motion angle, the vehicle motion angle being determined using sensor data received from the vehicle sensor; and causing the active rear steering system to perform an alignment mitigation action to mitigate negative effects of the misalignment on the vehicle.

11. The vehicle of claim 10, wherein the misalignment is classified as the front misalignment responsive to the vehicle heading angle being within a threshold difference of the vehicle motion angle.

12. The vehicle of claim 11, wherein no action is taken responsive to determining that the vehicle is not in the misalignment detection state.

13. The vehicle of claim 10, wherein the misalignment is classified as the rear misalignment responsive to the vehicle heading angle not being within a threshold difference of the vehicle motion angle.

14. The vehicle of claim 10, wherein the vehicle is in the misalignment detection state responsive to a speed of the vehicle being greater than a threshold, a lateral acceleration of the vehicle being substantially zero, and responsive to the vehicle traveling straight.

15. The vehicle of claim 10, wherein it is determined that the vehicle is experiencing the misalignment responsive to a steering wheel angle of a steering wheel of the vehicle being greater than a threshold, wherein the threshold is substantially zero.

16. The vehicle of claim 10, wherein performing the alignment mitigation action to mitigate negative effects of the misalignment on the vehicle comprises implementing an active rear steering remedial action responsive to classifying the misalignment as the rear misalignment.

17. The vehicle of claim 16, wherein implementing the active rear steering remedial action comprises:

measuring steering angle during straight ahead driving;

calculating a target rear road wheel angle offset during straight ahead driving; and applying the target rear road wheel angle offset to the active rear steering system using the sensor data collected by the vehicle sensor.

18. The vehicle of claim 10, wherein the vehicle sensor is a camera and the sensor data is image data from the camera.

19. A computer program product comprising a computer readable storage medium having program instructions embodied therewith, the program instructions executable by at least one processor to cause the at least one processor to perform operations for detecting front or rear vehicle misalignment using a vehicle sensor of the vehicle, the operations comprising:

determining whether the vehicle is in a misalignment detection state;

responsive to determining that the vehicle is in the misalignment detection state, determining whether the vehicle is experiencing a misalignment;

responsive to determining that the vehicle is experiencing the misalignment, classifying the misalignment as one of a front misalignment or a rear misalignment by comparing a vehicle heading angle to a vehicle motion angle, the vehicle motion angle being determined using sensor data received from the vehicle sensor; and causing an active rear steering system of the vehicle to perform an alignment mitigation action to mitigate negative effects of the misalignment on the vehicle.

20. The computer program product of claim 19, wherein the misalignment is classified as the front misalignment responsive to the vehicle heading angle being within a threshold difference of the vehicle motion angle.

* * * * *